US008460798B2

(12) United States Patent
Ishida et al.

(10) Patent No.: US 8,460,798 B2
(45) Date of Patent: Jun. 11, 2013

(54) WOOD MEMBER FOR MUSICAL INSTRUMENT AND METHOD OF MANUFACTURING THE SAME, AS WELL AS SOUNDBOARD MANUFACTURING SYSTEM AND METHOD

(75) Inventors: Muneo Ishida, Hamamatsu (JP); Yutaka Hagiwara, Hamamatsu (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 666 days.

(21) Appl. No.: 12/610,197

(22) Filed: Oct. 30, 2009

(65) Prior Publication Data

US 2010/0112368 A1 May 6, 2010

(30) Foreign Application Priority Data

Oct. 31, 2008 (JP) ................................ 2008-282534
Oct. 31, 2008 (JP) ................................ 2008-282535
Oct. 31, 2008 (JP) ................................ 2008-282536

(51) Int. Cl.
*B32B 21/04* (2006.01)

(52) U.S. Cl.
USPC ........ 428/537.1; 144/380; 144/402; 144/405; 144/406

(58) Field of Classification Search
USPC ................ 144/380, 402, 405, 406; 428/537.1
See application file for complete search history.

(56) References Cited

U.S. PATENT DOCUMENTS

2003/0084962 A1 * 5/2003 Abe et al. ...................... 144/380

FOREIGN PATENT DOCUMENTS

CN 1411964 A 4/2003
JP 3562517 6/2004

OTHER PUBLICATIONS

Chinese Office action dated Mar. 21, 2012 for corresponding Chinese Patent Application No. 200910208865.6, 4pp.
Pang, S., et al.; "Cooling and steam conditioning after high-temperature drying of *Pinus radiata* board: experimental investigation and mathematical modelling"; Wood Science and Technology 35; 2001; pp. 487-502.

* cited by examiner

*Primary Examiner* — Leszek Kiliman
(74) *Attorney, Agent, or Firm* — Christie, Parker & Hale, LLP

(57) ABSTRACT

A wood member for a musical instrument, which is capable of preventing occurrence of damage, such as cracking, to thereby ensure smooth and stable operation of the musical instrument and maintain excellent appearance of the same over a long time period. The wood member has compressive internal stress remaining at least in an outer peripheral portion thereof by being subjected to heating processing, cooling processing, and moisture conditioning processing, in advance. A wood workpiece as a workpiece for the wood member is heated at a predetermined temperature, and the heated wood workpiece is cooled. The cooled wood workpiece is subjected to moisture conditioning such that compressive internal stress is generated at least in an outer peripheral portion of the wood workpiece.

6 Claims, 12 Drawing Sheets

WOOD MEMBER FOR MUSICAL INSTRUMENT AND METHOD OF MANUFACTURING THE SAME, AS WELL AS SOUNDBOARD MANUFACTURING SYSTEM AND METHOD

CROSS-REFERENCE TO RELATED APPLICATION

This application claims priority of Japanese Patent Application Number 282534/2008, filed on Oct. 31, 2008, Japanese Patent Application Number 282535/2008, filed on Oct. 31, 2008, and Japanese Patent Application Number 282536/2008, filed on Oct. 31, 2008.

BACKGROUND OF THE INVENTION

1. Field of the Invention

The present invention relates to a wood member for a musical instrument, such as a key, a keyframe, or a hammer shank for use e.g. in a piano, and a method of manufacturing the wood member, as well as a soundboard manufacturing system and method for manufacturing a wooden soundboard for use in an acoustic musical instrument, such as a piano, a violin, or a guitar.

2. Description of the Related Art

Conventionally, there have been known a wood member for a musical instrument (hereinafter simply referred to as "the wood member") and a wood member manufacturing method, which are disclosed e.g. in Japanese Patent No. 3562517. According to the wood member manufacturing method, an unmachined or machined wood workpiece as a workpiece for the wood member (hereinafter simply referred to as "the wood workpiece") is left standing in an autoclave filled with high-pressure steam at a temperature of 120 to 200° C. and a pressure of 0.2 to 1.6 MPa for 1 to 60 minutes, whereby the wood member is manufactured. The wood workpiece has properties thereof modified by the high-pressure steam treatment and is deeply hued, whereby a unique texture and a deep feel which cannot be expected a wood member unsubjected to the high-pressure steam treatment are obtained, and a coating process is shortened.

The above-described manufacturing method is applied to a soundboard manufacturing method as well. In this case, a soundboard workpiece as a workpiece for a soundboard has its properties modified by the high-pressure steam treatment. As a consequence, an increase in the Young's modulus of the soundboard workpiece, reduction of loss tangent, reduction of density, etc. are achieved, and the acoustic conversion efficiency of the soundboard is increased, whereby a soundboard is obtained which is excellent in vibration characteristics i.e. acoustic characteristics.

In general, the wood member is apt to suffer from damage, such as cracking, which is caused by growth of a fine flaw in an outer peripheral portion thereof due to tensile stress. In the meanwhile, in the case of the conventional wood member, the wood workpiece has its properties modified only by the high-pressure steam treatment, and hence it is impossible to prevent damage to the wood member due to the above-mentioned factor. Therefore, there is a fear that occurrence of damage adversely affects the operation of the musical instrument or the appearance of the same.

Further, in the above-described soundboard manufacturing method, in which the soundboard workpiece is only left standing in high-pressure steam at a predetermined temperature and a predetermined pressure over a predetermined time period, it is only possible to perform the overall temperature adjustment of the soundboard workpiece, but it is impossible to control the actual temperature of the soundboard workpiece in a fine-grained manner. For this reason, the actual temperature of the soundboard workpiece cannot be controlled to an appropriate temperature, and therefore it is impossible to obtain a soundboard workpiece whose properties are accurately modified by heating. Furthermore, internal strain is apt to remain in the manufactured soundboard, which makes internal friction in the soundboard relatively high. Therefore, there is a fear that the internal friction degrades the acoustic characteristics of the soundboard.

SUMMARY OF THE INVENTION

It is a first object of the present invention to provide a wood member for a musical instrument, which is capable of preventing occurrence of damage, such as cracking, to thereby ensure smooth and stable operation of the musical instrument and maintain an excellent appearance of the same over a long time period, and a method of manufacturing the wood member.

It is a second object of the present invention to provide a soundboard manufacturing system which is capable of accurately manufacturing a soundboard having desired properties modified by heating.

It is a third object of the present invention to provide a soundboard manufacturing system and method, which are capable of improving the acoustic characteristics of a soundboard.

To attain the above first object, in a first aspect of the present invention, there is provided a wood member for a musical instrument, wherein the wood member has compressive internal stress remaining at least in an outer peripheral portion thereof by being subjected to heating processing, cooling processing, and moisture conditioning processing, in advance.

This wood member for a musical instrument is subjected to heating processing, cooling processing, and moisture conditioning processing, in advance. The heating processing increases the degree of crystallization of cellulose forming the wood member, which causes an increase in the Young's modulus, reduction of the equilibrium moisture content, and lowering of hygroscopicity. Thus, the degree of swelling/shrinkage of the wood member caused by its becoming dry and damp (hereinafter referred to as "the swelling/shrinkage rate") is reduced, which makes it possible to improve the dimensional stability of the wood member.

The wood member is in a state fully dried by the heating processing, further subjected to the cooling processing, and thereafter subjected to the moisture conditioning processing such that it has a moisture content adapted to a use environment, in advance. In the moisture conditioning, moisture enters the wood member from the surface thereof, but is not uniformly dispersed within the wood member. This causes a moisture content gradient to occur within the wood member, and the swelling rate varies with the moisture content gradient, so that compressive internal stress remains at least in the outer peripheral portion of the wood member. This compressive internal stress prevents a fine flaw in the outer peripheral portion of the wood member from growing due to tensile stress, and thereby makes cracking difficult to occur in the wood member. As a result, the wood member is capable of not only ensuring smooth and stable operation of the musical instrument more reliably than the conventional wood member, but also maintaining excellent appearance of the musical instrument over a longer time period, which also contributes to reduction of the maintenance costs for the musical instrument.

To attain the above first object, in a second aspect of the present invention, there is provided a method of manufacturing a wood member for a musical instrument, comprising a heating step of heating a wood workpiece as a workpiece for the wood member at a predetermined temperature, a cooling step of cooling the heated wood workpiece, and a moisture conditioning step of performing moisture conditioning of the cooled wood workpiece such that compressive internal stress is generated at least in an outer peripheral portion of the wood workpiece.

According to this wood member manufacturing method, first, a wood workpiece as a workpiece for the wood member is heated. This causes, as described above, reduction of the swelling/shrinkage rate of the wood member, and hence suppresses dimensional change of the wood member. As a result, it is possible to improve the manufacturing yield of wood members to thereby reduce manufacturing costs.

Further, the wood workpiece fully dried by the heating processing is cooled, and then the fully dried wood workpiece is subjected to moisture conditioning such that it has a moisture content adapted to a use environment. At this time, moisture enters the wood workpiece from the surface thereof, but is not uniformly dispersed within the wood workpiece. This causes a moisture content gradient to occur within the wood workpiece, and the swelling rate varies with the moisture content gradient, so that compressive internal stress is generated at least in the outer peripheral portion of the wood workpiece. The compressive internal stress prevents a fine flaw in the outer peripheral portion of the wood workpiece from growing due to tensile stress, and thereby makes cracking difficult to occur in the wood workpiece. As a result, the wood member is less susceptible to damage than a wood member manufactured by the conventional method, and therefore it is possible to ensure smooth and stable operation of the musical instrument and maintain excellent appearance of the same.

Preferably, the moisture conditioning step includes a drying step of drying the cooled wood workpiece such that a moisture content of the wood workpiece reaches equilibrium.

According to this preferred embodiment, by drying the cooled wood workpiece, the wood workpiece absorbs moisture in the air, whereby the moisture content of the wood workpiece reaches equilibrium. This makes the absorbance and release of moisture difficult to occur in the wood member, and therefore it is possible to further suppress the dimensional change and deformation of the wood member caused by becoming dry or damp.

To attain the above second object, in a third aspect of the present invention, there is provided a soundboard manufacturing system for manufacturing a wooden soundboard that is used in an acoustic musical instrument and is vibrated for generating musical tones, comprising preliminary moisture conditioning means for performing preliminary moisture conditioning to adjust humidity of a wooden soundboard workpiece as a workpiece for the soundboard, a heating chamber for receiving therein the soundboard workpiece subjected to the preliminary moisture conditioning, first and second heaters disposed in the heating chamber in a manner facing respective front and back sides of the soundboard workpiece received in the heating chamber, for heating the soundboard workpiece, first and second temperature sensors for detecting respective front-side and back-side temperatures of the soundboard workpiece, and control means for controlling the first and second heaters such that the detected front-side and back-side temperatures of the soundboard workpiece becomes a first predetermined temperature and a second predetermined temperature, respectively.

According to this soundboard manufacturing system, the soundboard workpiece subjected to preliminary moisture conditioning is heated by the first and second heaters in the heating chamber. This heating processing increases the degree of crystallization of cellulose forming the soundboard workpiece, which causes an increase in the Young's modulus, reduction of the equilibrium moisture content, and lowering of hygroscopicity. This makes it possible to reduce the swelling/shrinkage rate of the soundboard workpiece, so that it is possible to improve the dimensional stability of the soundboard workpiece.

Further, according to the above-described soundboard manufacturing system, the front-side and back-side temperatures of the soundboard workpiece are detected by the respective first and second temperature sensors, and the first and second heaters are controlled by the control means such that the detected front-side and back-side temperatures become the first predetermined temperature and the second predetermined temperature, respectively. Thus, the actual front-side and back-side temperatures can be controlled independently of each other in a fine-grained manner such that they become the respective first and second predetermined temperatures, and therefore it is possible to accurately manufacture the soundboard having desired properties modified by the heating processing.

Preferably, the soundboard manufacturing system further comprises cooling means for cooling the heated soundboard workpiece, and moisture conditioning means for performing moisture conditioning of the soundboard workpiece cooled by the cooling means, such that compressive internal stress remains at least in an outer peripheral portion of the soundboard workpiece.

According to this preferred embodiment, the soundboard workpiece heated and fully dried is cooled by the cooling means, and thereafter is subjected to moisture conditioning. In this moisture conditioning processing, moisture enters the soundboard workpiece from the surface thereof, but is not uniformly dispersed within the soundboard workpiece. This causes a moisture content gradient to occur within the soundboard workpiece, and the swelling rate varies with the moisture content gradient, so that compressive internal stress remains at least in the outer peripheral portion of the soundboard workpiece. This compressive internal stress prevents a fine flaw in the outer peripheral portion of the soundboard workpiece from growing due to tensile stress, and makes it possible to make cracking difficult to occur in the soundboard. As a result, the soundboard can maintain the acoustic characteristics more excellently than the conventional soundboard, which makes it possible to ensure excellent sound quality and sound volume of the musical instrument. Further, since the soundboard is difficult to crack, it is possible to reduce maintenance costs required for replacement or repair of the soundboard.

Preferably, the first predetermined temperature and the second predetermined temperature are different from each other.

According to this preferred embodiment, by heating the front-side and back-side temperatures of the soundboard workpiece to respective temperatures different from each other, it is possible to make the degree of crystallization of cellulose different between the front-side and back-side peripheral portions of the soundboard workpiece and thereby make the hygroscopicity and swelling/shrinkage rate of the same different between the same according to the difference in the degree of crystallization of cellulose. As a consequence, e.g. when producing an acoustic piano soundboard by joining a plurality of soundboard workpieces, it is possible to easily and stably form a so-called "crown", i.e. an convex bend of the front surface of the soundboard on which bridges are mounted, by setting the first predetermined temperature to a lower value.

To attain the above third object, in a fourth aspect of the present invention, there is provided a soundboard manufacturing system for manufacturing a wooden soundboard that is used in an acoustic musical instrument and is vibrated for generating musical tones, comprising moisture conditioning means for performing moisture conditioning of a wooden soundboard workpiece as a workpiece for the soundboard such that the soundboard workpiece has a predetermined moisture content, heating means for heating the soundboard workpiece at a predetermined temperature, and vibrating means for vibrating the soundboard workpiece.

According to this soundboard manufacturing system, the soundboard workpiece as a workpiece for the soundboard is heated by the heating means. This heating processing increases the degree of crystallization of cellulose forming the soundboard workpiece. Specifically, the proportion of crystalline cellulose is increased, and that of amorphous cellulose or hemicellulose is relatively reduced, which causes reduction of the equilibrium moisture content and lowering of hygroscopicity. This causes the swelling/shrinkage rate of the soundboard workpiece to be reduced, so that it is possible to improve the dimensional stability of the soundboard workpiece.

Further, the soundboard workpiece has its properties modified by the heating processing, so that it is possible to achieve an increase in the Young's modulus, reduction of internal friction, and reduction of density. This increases the acoustic conversion efficiency of the soundboard, thereby making it possible to obtain a soundboard excellent in acoustic characteristics.

Further, according to this soundboard manufacturing system, the soundboard workpiece is vibrated by the vibrating means, whereby the molecular orientation of the soundboard workpiece is stabilized, and internal strain remaining in the soundboard workpiece is eliminated. As a result, internal friction in the soundboard workpiece can be reduced, which makes it possible to manufacture a soundboard more excellent in acoustic characteristics than the conventional soundboard.

To attain the above third object, in a fifth aspect of the present invention, there is provided a method of manufacturing a wooden soundboard that is used in an acoustic musical instrument and is vibrated for generating musical tones, comprising a moisture conditioning step of performing moisture conditioning of a wooden soundboard workpiece as a workpiece for the soundboard such that the soundboard workpiece has a predetermined moisture content, a heating step of heating the soundboard workpiece subjected to the moisture conditioning at a predetermined temperature, and a vibrating step of applying vibration to the heated soundboard workpiece.

According to this soundboard manufacturing method, first in the moisture conditioning step, the soundboard workpiece as a workpiece for the soundboard is subjected to moisture conditioning such that the soundboard workpiece has the predetermined moisture content. This moisture conditioning processing makes it possible to more efficiently and quickly adjust the soundboard workpiece such that it has a desired moisture content than when the soundboard workpiece is subjected to natural seasoning.

Then, in the heating step, the soundboard workpiece subjected to the moisture conditioning is heated at the predetermined temperature. As a consequence, as described above, the rate of swelling/shrinkage of the soundboard workpiece caused by its becoming dry and damp is reduced, whereby dimensional change of the soundboard workpiece is suppressed. This makes it possible to improve the manufacturing yield of the soundboard workpieces to thereby reduce manufacturing costs.

Finally, in the vibrating step, the heated soundboard workpiece is vibrated, whereby the molecular orientation of the soundboard workpiece is stabilized, and internal strain still remaining in the soundboard workpiece even after execution of the heating processing is eliminated. As a result, internal friction in the soundboard workpiece can be reduced, which makes it possible to manufacture a soundboard more excellent in acoustic characteristics than the conventional soundboard.

The above and other objects, features, and advantages of the present invention will become more apparent from the following detailed description taken in conjunction with the accompanying drawings.

DETAILED DESCRIPTION OF PREFERRED EMBODIMENTS

Figure 1:
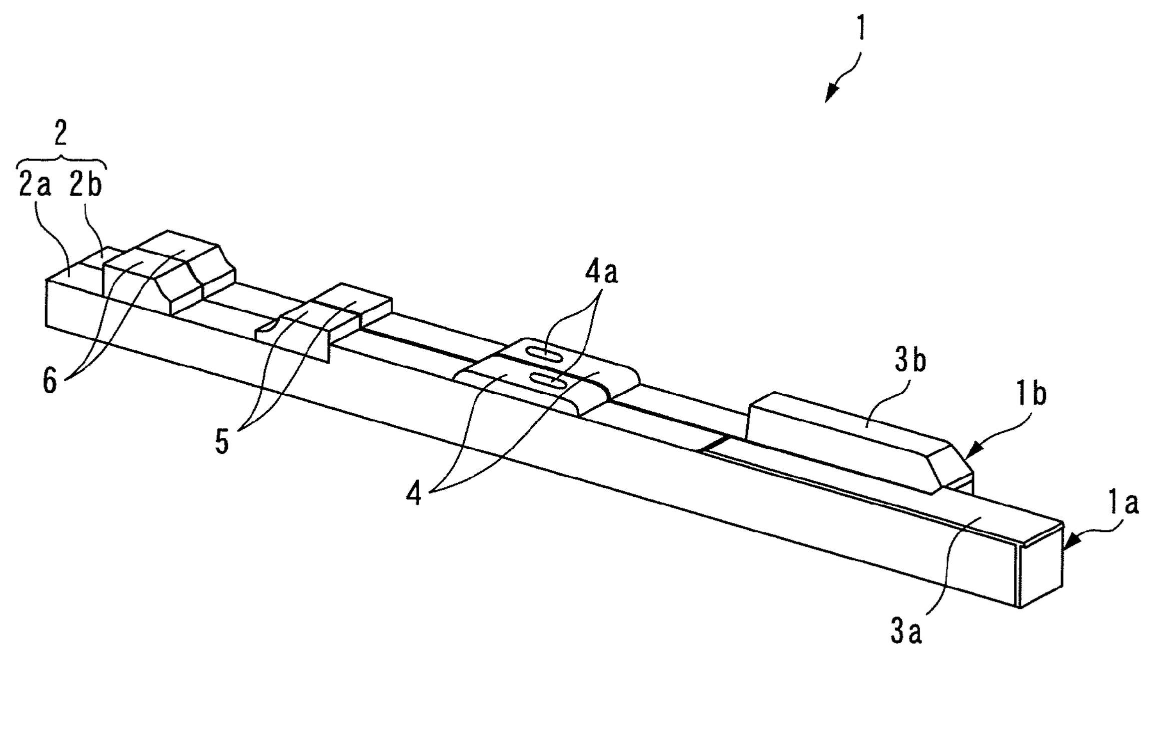
FIG. 1 is a perspective view of a grand-piano key to which is applied a first embodiment of the present invention.
Figure 2A:
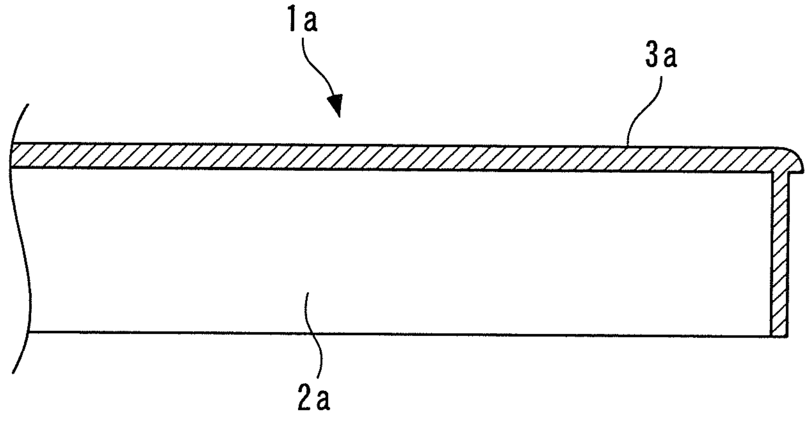
FIG. 2A is a longitudinal cross-sectional view of a white key.
Figure 2B:
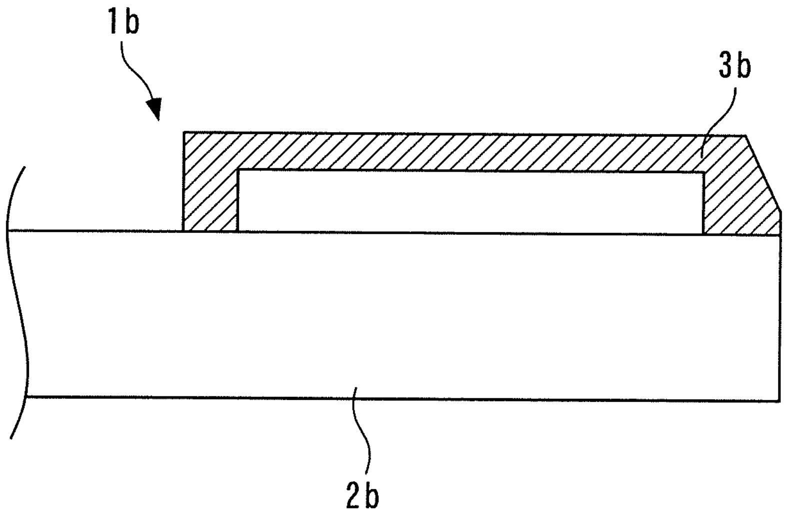
FIG. 2B is a longitudinal cross-sectional view of a black key.

The present invention will now be described in detail with reference to the drawings showing preferred embodiments thereof. FIG. 1 shows a grand-piano key 1 to which is applied a first embodiment of the present invention. The key 1 is comprised of a white key 1a and a black key 1b. As shown in FIG. 2A, the white key 1a includes a key body 2a as a wood member and a white key cover 3a mounted on the front portion of an upper surface of the key body 2a. Further, as shown in FIG. 2B, the black key 1b includes a key body 2b and a black key cover 3b mounted on the front portion of an upper surface of the key body 2b.

The key body 2a of the white key 1a and the key body 2b of the black key 1b (hereinafter each generically referred to as "the key body 2") is formed of solid flat-grain wood of spruce or the like. The key body 2 is rectangular in cross section, and extends in the front-rear direction. A middle plate 4 formed with a balance rail pin hole 4a is glued to a central portion of the key body 2 in the front-rear direction. Further, a capstan plate 5 into which a capstan screw (not shown) is screwed is glued to a portion rearward of the middle plate 4, and a backcheck plate 6 to which a backcheck (not shown) is mounted is glued to a rear end of the key body 2.

The white key cover 3a is formed of a cellulose acetate resin or the like, and has an L shape in side cross section (see FIG. 2A).

The black key cover 3b is formed of a synthetic resin, such as a phenol resin. The black key cover 3b extends in the front-rear direction, and has a hollow shape open downward (see FIG. 2B).

Figure 3:
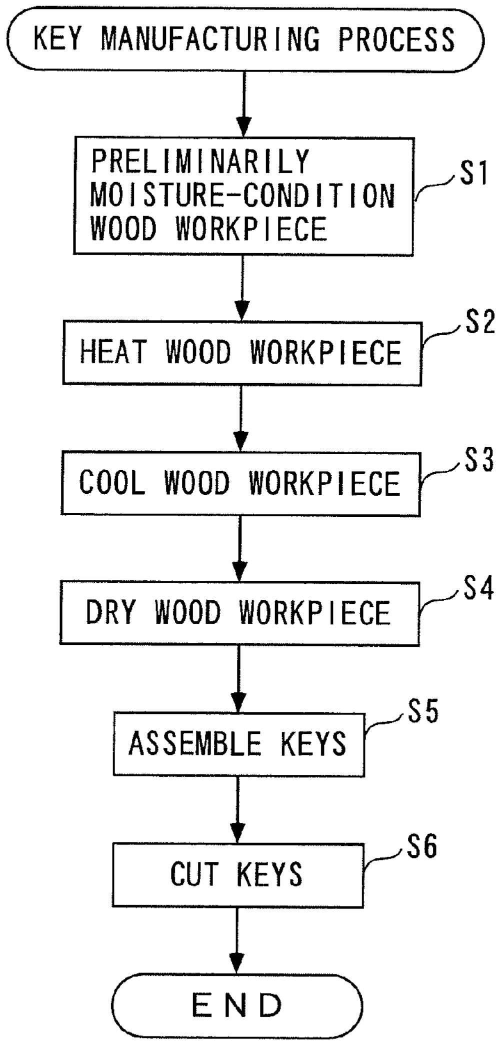
FIG. 3 is a diagram showing a flow of a key manufacturing process.

Next, a method of manufacturing the keys 1 each constructed as above will be described in detail. FIG. 3 shows a flow of an overall key manufacturing process.

Figure 4:
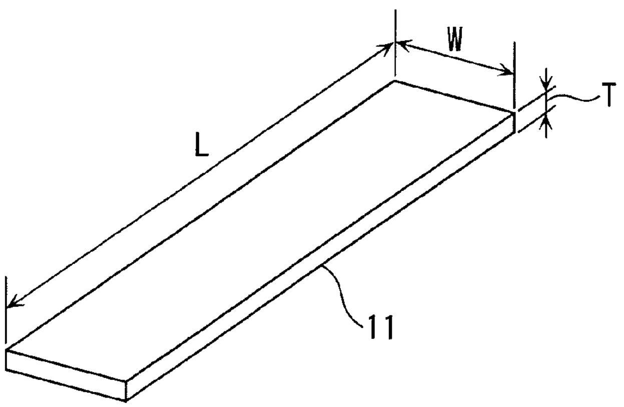
FIG. 4 is a perspective view of a wood workpiece.

First, in a step 1 (shown as S1 in abbreviated form in FIG. 3; the following steps are also shown in abbreviated form), a plurality of wood workpieces 11 as workpieces for respective key bodies 2 are each subjected to preliminary moisture conditioning (preliminary moisture conditioning step). As shown in FIG. 4, each of the wood workpieces 11 is formed into an elongated shape having, as a standardized size, a length L of 500 mm, a width W of 50 to 150 mm, and a thickness T of 25 mm, for example.

This preliminary moisture conditioning for the wood workpieces 11 is performed, after cutting raw wood, such as spruce, into boards, by putting the boards into a preliminary moisture conditioning chamber (not shown), and forcibly drying them under conditions of a predetermined temperature (e.g. 50 to 100° C.) and a predetermined humidity (30 to 90%). As a consequence, the wood workpieces 11 are adjusted to have a predetermined moisture content (e.g. 8%).

Figure 5:
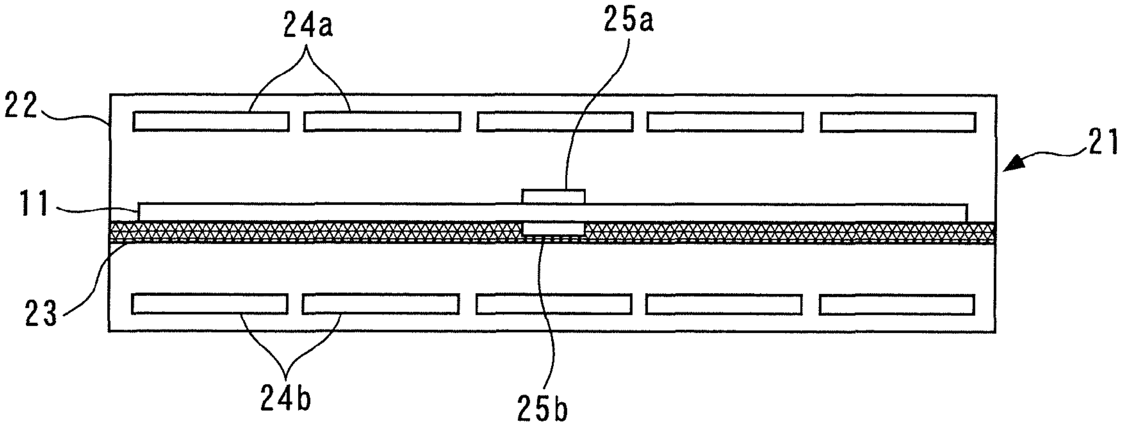
FIG. 5 is a schematic view of a heating device.
Figure 6:
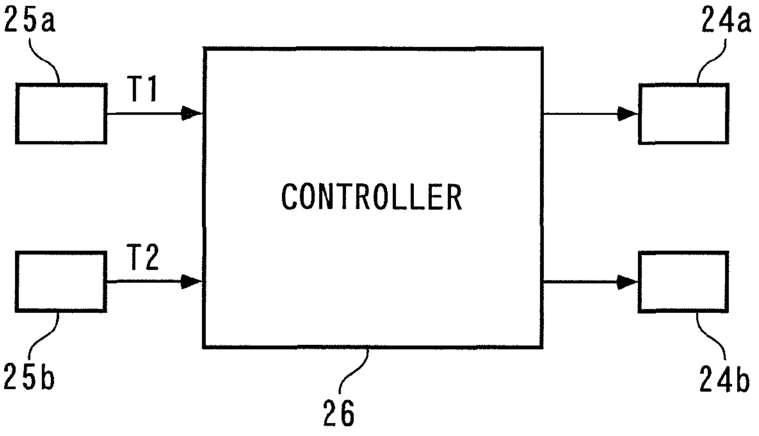
FIG. 6 is a diagram useful in explaining control by the heating device.

Then, in a step 2, the wood workpieces 11 subjected to the preliminary moisture conditioning in the step 1 are heated by a heating device 21 shown in FIGS. 5 and 6 (heating step).

The heating device 21 is comprised of a heating chamber 22 having a flat box shape, a mesh belt 23 which horizontally extends in the heating chamber 22 and on which the wood workpieces 11 are placed, a plurality of first heaters 24a and second heaters 24b for heating the wood workpieces 11, a first temperature sensor 25a and a second temperature sensor 25b for detecting a front-side temperature T1 and a back-side temperature T2 of each wood workpiece 11, respectively, and a controller 26 for controlling the first and second heaters 24a and 24b.

The first and second heaters 24a and 24b are longitudinally arranged at equally spaced intervals above and below the mesh belt 23, respectively, in a manner spaced therefrom. Each of the first and second heaters 24a and 24b is implemented e.g. by a far-infrared heater that operates while being turned on and off.

The first and second temperature sensors 25a and 25b are directly mounted on central portions of the respective front and back sides of each wood workpiece 11. Each of the first and second temperature sensors 25a and 25b is formed e.g. by a thermocouple, and detects an associated one of the front-side and back-side temperatures T1 and T2 to output an electric signal indicative of the sensed temperature to the controller 26.

The controller 26 is implemented by a microcomputer including a CPU, a ROM, a RAM, and input and output circuits. As shown in FIG. 6, the controller 26 controls the first and second heaters 24a and 24b according to the front-side and back-side temperatures T1 and T2 output from the respective first and second temperature sensors 25a and 25b, as described hereinafter.

In the heating step, a plurality of wood workpieces 11 (only one of which is shown in FIG. 5) are arranged on the mesh belt 23 such that each of the wood workpieces 11 extends in the direction of arrangement of the first and second heaters 24a and 24b, and after the heating chamber 22 is closed, the wood workpieces 11 are heated by the first and second heaters 24a and 24b over a predetermined time period. The predetermined time period is generally set e.g. within a range of 30 minutes to 30 hours, and in the present embodiment, it is set to 25 hours.

Figure 7:
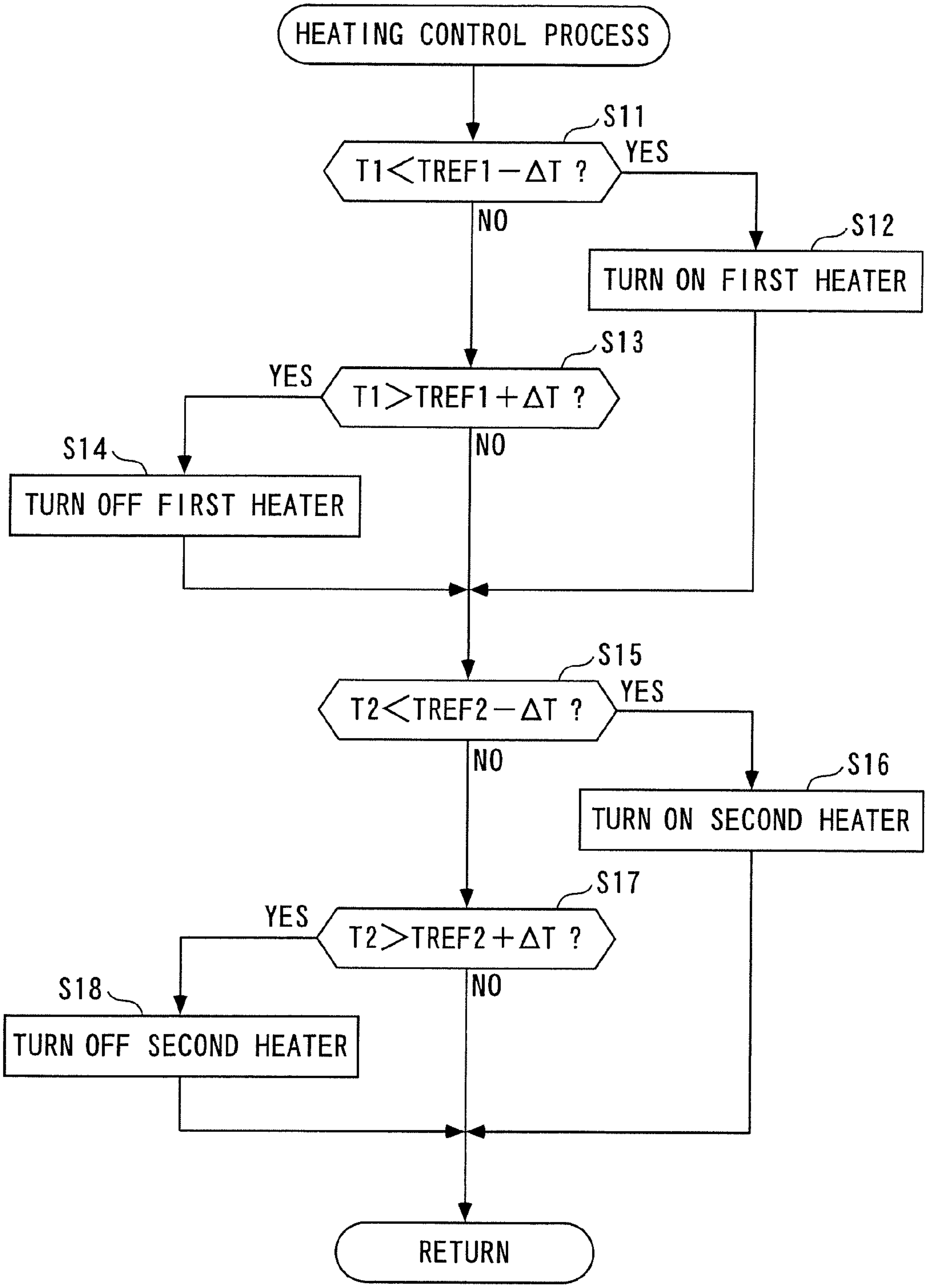
FIG. 7 is a flowchart of a heating control process executed by a controller appearing in FIG. 6.

FIG. 7 is a flowchart of a heating control process executed by the controller 26 so as to control heating performed by the first and second heaters 24a and 24b. The present process is repeatedly carried out at predetermined time intervals (e.g. of 0.1 seconds). In the present process, first, the first heaters 24a are controlled in steps 11 to 14.

In the step S11, it is determined whether or not the front-side temperature T1 detected by the first temperature sensor 25a is lower than a temperature $(TREF1-\Delta T)$ obtained by subtracting a predetermined value $\Delta T$ (e.g.)2°) corresponding to a hysteresis from a first predetermined temperature TREF1. If the answer to the question of this step is affirmative (YES), the first heaters 24a are operated (i.e. turned on) (step 12), and then the process proceeds to a step 15.

On the other hand, if the answer to the question of the step 11 is negative (NO), it is determined in the step 13 whether or not the front-side temperature T1 is higher than a temperature $(TREF1+\Delta T)$ obtained by adding the predetermined value $\Delta T$ to the first predetermined temperature TREF1. If the answer to the question of this step is affirmative (YES), the first heaters 24a are stopped (i.e. turned off) (step 14), and then the process proceeds to the step 15.

If the answer to the question of the step 13 is negative (NO), the process immediately proceeds to the step 15.

The first heaters 24a are controlled as above, whereby the front-side temperature T1 detected by the first temperature sensor 25a is controlled to the first predetermined temperature TREF1.

Further, if the front-side temperature T1 is within a range of $(TREF1-\Delta T) \leqq T1 \leqq (TREF1+\Delta T)$ (NO to the step 13), the ON/OFF state of each of the first heaters 24a immediately before the start of the present process is held, whereby frequent ON/OFF switching of the first heaters 24a is prevented.

Then, in the step 15 and steps 16 to 18, the second heaters 24b are controlled.

In the step 15, it is determined whether or not the back-side temperature T2 detected by the second temperature sensor 25b is lower than a temperature $(TREF2-\Delta T)$ obtained by subtracting the predetermined value $\Delta T$ from a second predetermined temperature TREF2 (e.g. 105 to 200° C.). If the answer to the question of this step is affirmative (YES), the second heaters 24*b* are operated (step 16), followed by terminating the present process.

On the other hand, if the answer to the question of the step 15 is negative (NO), it is determined in the step 17 whether or not the back-side temperature T2 is higher than a temperature (TREF2+ΔT) obtained by adding the predetermined value ΔT to the second predetermined temperature TREF2. If the answer to the question of this step is affirmative (YES), the second heaters 24*b* are stopped (step 18), followed by terminating the present process.

If the answer to the question of the step 17 is negative (NO), the process is immediately terminated.

The second heaters 24*b* are controlled as described above, whereby the back-side temperature T2 detected by the second temperature sensor 25*b* is controlled to the second predetermined temperature TREF2.

Further, if the back-side temperature T2 is within a range of (TREF2−ΔT)≦T2≦(TREF2+ΔT) (NO to the step 17), the ON/OFF state of each of the second heaters 24*b* immediately before the start of the present process is held, whereby frequent ON/OFF switching of the second heaters 24*b* is prevented.

Referring again to FIG. 3, in a step 3, the heated wood workpieces 11 are put into a cooling chamber (not shown) to be rapidly cooled under conditions of a predetermined temperature (e.g. 20° C.) and a predetermined humidity (e.g. 50%) (cooling step). Before executing the cooling step, the wood workpieces 11 are in a so-called fully dried state with a moisture content of 0% by the execution of the heating processing.

Then, in a step 4, the cooled wood workpieces 11 are put into a drying chamber (not shown) so as to be dried under conditions of a predetermined temperature (e.g. 20° C.) and a predetermined humidity (e.g. 60%) (drying step). By this drying processing, each of the wood workpieces 11 absorbs moisture within the drying chamber, whereby the moisture content of the wood workpiece 11 reaches equilibrium. However, the moisture, which enters each of the wood workpiece 11 from the surface thereof, is not uniformly dispersed within the wood workpiece 11. This causes a moisture content gradient to occur within each of the wood workpieces 11, so that while the outer peripheral portion of each wood workpiece 11 swells due to moisture absorption, an inner portion of the wood workpiece 11 other than the outer peripheral portion is held substantially in the fully dried state, so that the inner portion still continues to be in a shrunk state. As a consequence, due to the difference in swelling between the two portions, the swelling of the outer peripheral portion is restrained by the inner portion, so that compressive internal stress remains in the outer peripheral portion while tensile internal stress remains in the inner portion.

Figure 8:
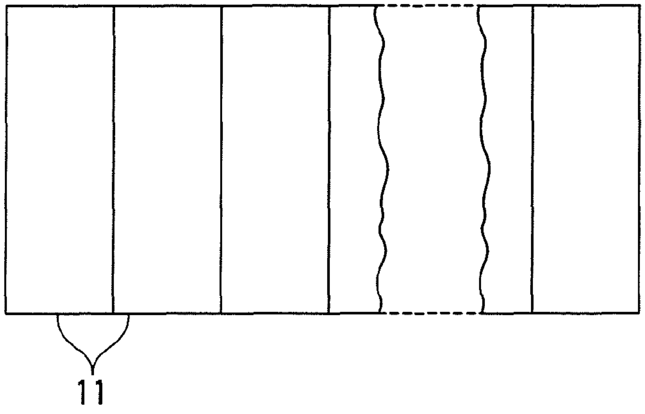
FIG. 8 is a plan view showing a state in which a plurality of wood workpieces are joined side by side.
Figure 9:
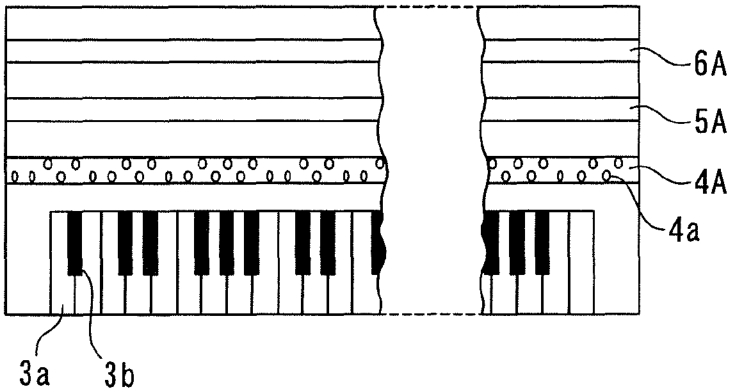
FIG. 9 is a plan view showing a state in which a white key cover, etc. are glued onto the wood pieces joined side by side.

Then, in a step 5, the dried wood workpieces 11 are assembled (assembling step). Specifically, the wood workpieces 11 are joined side by side (see FIG. 8), whereafter the white key covers 3*a* and the black key covers 3*b* are glued onto predetermined portions of the wood workpieces 11 joined side by side, which correspond to front portions of respective key bodies 2*a* for a whole piano, and a belt-like middle plate 4A, a belt-like capstan plate 5A, and a belt-like backcheck plate 6A each for the whole piano are glued onto respective portions of the wood workpieces 11 joined side by side, which are rearward of the white key covers 3*a* and the black covers 3*b* (see FIG. 9). It should be noted that each set of white key covers 3*a* corresponding to one octave is formed as a molded unit.

Figure 10:
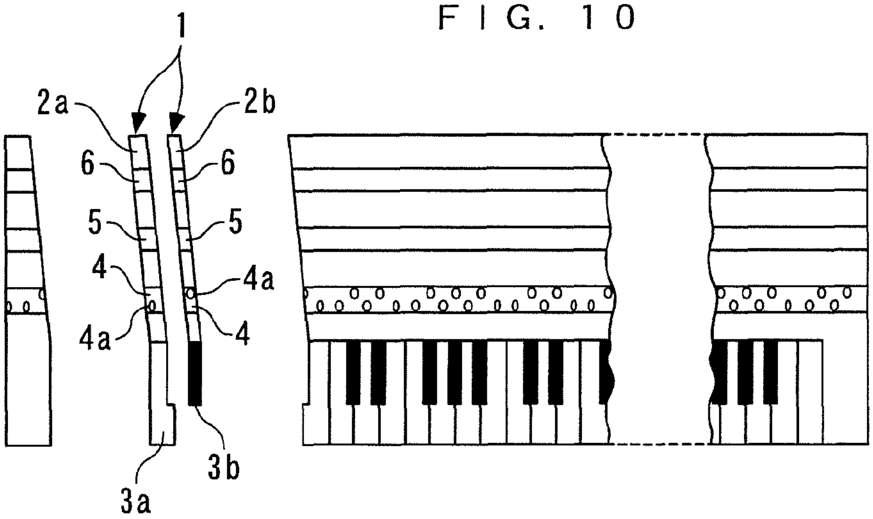
FIG. 10 is a view showing a state in which the wood workpieces joined side by side and having white key covers and the like glued thereon are rip cut.

Finally, in a step 6, the wood workpieces 11 assembled as above are cut into strips, as shown in FIG. 10, using a rip cutting machine (not shown) (cutting step). Thus, the keys 1, only one of which is shown in FIG. 1, are finished.

As is apparent from the above description, according to the present embodiment, since the wood workpieces 11 as workpieces for the keys 1 are heated as described hereinbefore, the degree of crystallization of cellulose forming the wood workpieces 11 is increased, which makes it possible to reduce the swelling/shrinkage rate of the wood workpieces 11 to thereby suppress the dimensional change and deformation of each of the key bodies 2 caused by its becoming dry and damp. As a consequent, it is possible not only to stably maintain touch feeling of each key 1, but also to prevent generation of noises due to contact between adjacent keys.

Further, since the dimensional change of the respective key bodies 2 is suppressed, the manufacturing yield of the keys 1 is improved, which makes it possible to reduce manufacturing costs.

Furthermore, when heating the wood workpieces 11, the first and second heaters 24*a* and 24*b* are controlled independently of each other such that the detected front-side and back-side temperatures T1 and T2 becomes the first and second predetermined temperatures TREF1 and TREF2, respectively. This makes it possible to control the front-side and back-side temperatures T1 and T2 of each of the wood workpieces 11 in a fine-grained manner. Therefore, it is possible to accurately manufacture the wood workpieces 11 having desired properties modified by the heating processing.

What is more, since the heated wood workpieces 11 are subjected to cooling and moisture conditioning, compressive internal stress remaining in the outer peripheral portion of the wood workpieces 11 prevents a fine flaw in the outer peripheral portion of the wood workpiece 11 from growing due to tensile stress, to thereby make cracking difficult to occur in the key body 2. As a result, the keys 1 are capable of not only ensuring smooth and stable operation more reliably than the conventional keys, but also maintaining excellent appearance over a longer time period. This contributes to reduction of maintenance costs.

Additionally, each wood workpiece 11 is dried after being cooled, whereby the moisture content of the wood workpiece 11 reaches equilibrium. This makes the wood workpiece 11 difficult to absorb or release moisture, and therefore it is possible to further suppress the dimensional change and deformation of the key body 2 caused by its becoming dry and damp.

It should be noted that although in the present embodiment, compressive internal stress and tensile internal stress are caused to remain in the outer peripheral portion and the inner portion of each wood workpiece 11, respectively, by execution of rapid cooling and moisture conditioning after the heating processing, processing may be performed such that the compressive internal stress remains all over within each wood workpiece 11.

Next, a description will be given of a soundboard manufacturing system for manufacturing a grand-piano soundboard, according to a second embodiment of the present invention.

Figure 11:
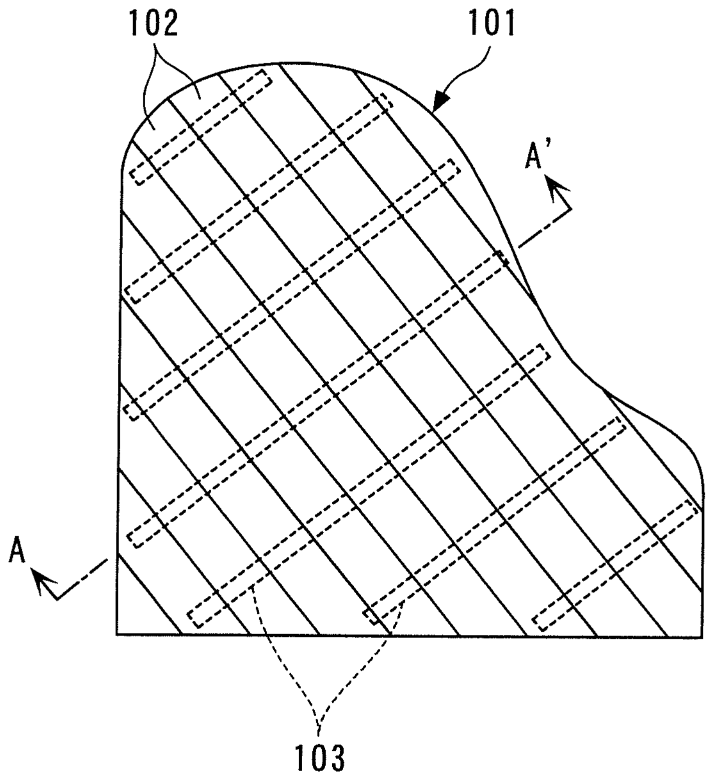
FIG. 11 is a plan view of a grand-piano soundboard to which is applied a second embodiment of the present invention.

FIG. 11 shows a grand-piano soundboard manufactured by application of the present invention. As shown in FIG. 11, the soundboard 101 is formed by joining a plurality of wooden soundboard workpieces 102 side by side, and has the same shape in plan view as that of a grand piano. The soundboard 101 has a plurality of sound ribs 103 mounted on a lower surface thereof, and has a crown formed on the upper or front side along the length of the sound ribs 103, as shown in FIG.

12. Further, a long bridge and a short bridge, not shown, are mounted on the upper surface of the soundboard 101, and strings are stretched in a state engaged with the long and short bridges.

A string is struck in accordance with key depression, and vibration of the string caused thereby is transmitted to the soundboard 101 via the long bridge and the short bridge, whereby the soundboard 101 generates a piano tone.

The soundboard manufacturing system according to the second embodiment includes a heating device 21 for heating soundboard workpieces 102, a preliminary moisture conditioning device (not shown) for preliminarily conditioning the humidity of each of the soundboard workpieces 102, and a cooling device (not shown) for cooling the soundboard workpieces 102.

The heating device 21 in the present embodiment is identical in arrangement to that in the first embodiment except that soundboard workpieces are processed, and therefore description thereof is omitted, with the same reference numerals denoting the respective component parts thereof.

Figure 13:
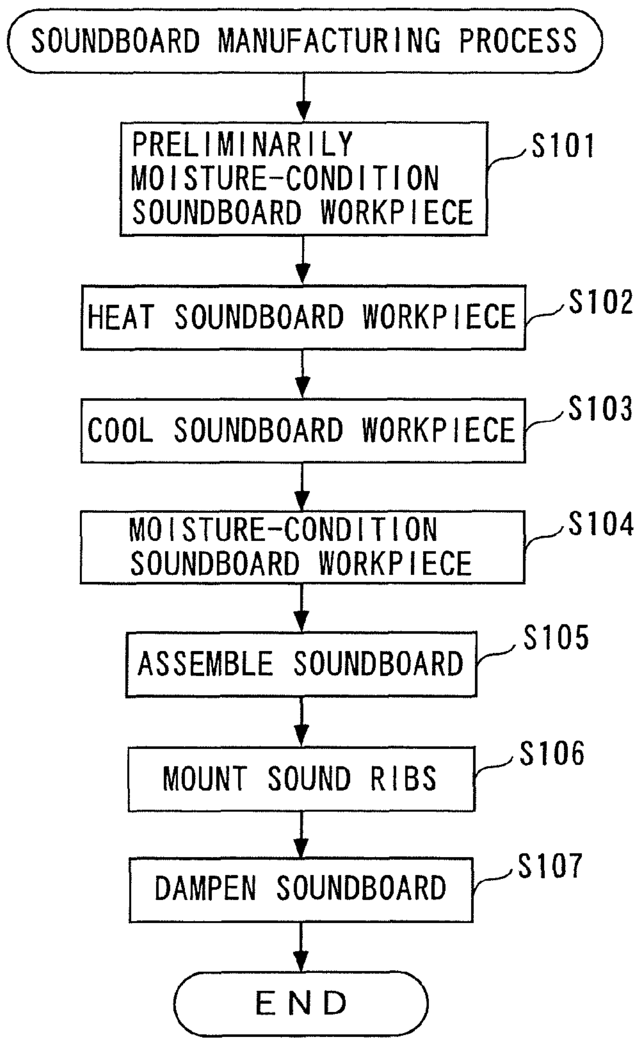
FIG. 13 is a diagram showing a flow of a soundboard manufacturing process.

In the following, a description will be given of a method of manufacturing a soundboard 101 using the soundboard manufacturing system. FIG. 13 shows a flow of an overall soundboard manufacturing process.

Figure 14:
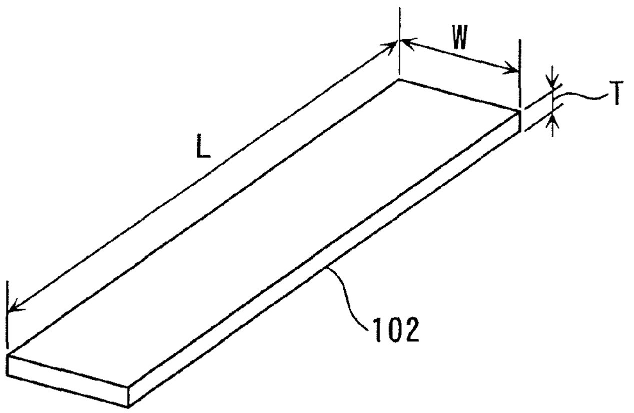
FIG. 14 is a perspective view of a soundboard workpiece.

First in a step 101, a plurality of soundboard workpieces 102 are subjected to preliminary moisture conditioning (preliminary moisture conditioning step). The soundboard workpieces 102 are made of solid straight-grained wood of spruce or the like, and each of them is formed into an elongated shape having, as a standardized size, a length L of 1500 mm, a width W of 100 to 150 mm, and a thickness T of 11 mm, for example, as shown in FIG. 14.

This preliminary moisture conditioning for the soundboard workpieces 102 is performed, after cutting raw wood, such as spruce, into boards, by putting the boards into a preliminary moisture conditioning chamber (not shown) to forcibly dry them under conditions of a predetermined temperature (e.g. 50 to 100° C.) and a predetermined humidity (30 to 90%). As a consequence, the soundboard workpieces 102 are adjusted to have a predetermined moisture content e.g. below 10%.

Then, in a step 102, the soundboard workpieces 102 which are moisture-conditioned in the step 101 are heated (heating step). This heating step is the same as that in the first embodiment, i.e. the heating processing for heating wood workpieces, and therefore description thereof is omitted.

In the following step 103, the heated soundboard workpieces 102 are put into a cooling chamber (not shown) to be rapidly cooled under conditions of a predetermined temperature (e.g. 20° C.) and a predetermined humidity (e.g. 50%) (cooling step). Before executing the cooling step, the soundboard workpieces 102 are in a so-called fully dried state with a moisture content of 0% by execution of the heating processing.

Then, in a step 104, the cooled soundboard workpieces 102 are subjected to moisture conditioning such that the soundboard workpieces 102 have a moisture content adapted to a use environment (moisture conditioning step). In this case, moisture enters each of the soundboard workpieces 102 from the surface thereof, but is not uniformly dispersed within the soundboard workpiece 102. This causes a moisture content gradient to occur within the soundboard workpiece 102, and the swelling rate varies with the moisture content gradient, so that while the outer peripheral portion of the soundboard workpiece 102 swells due to moisture absorption, an inner portion of soundboard workpiece 102 other than the outer peripheral portion is held in the fully dried state, so that the inner portion still continues to be in a shrunk state. As a consequence, due to the difference in swelling between the two portions caused by the moisture content gradient within the soundboard workpiece 102, the swelling of the outer peripheral portion is restrained by the inner portion, so that compressive internal stress remains in the outer peripheral portion while tensile internal stress remains in the inner portion.

Figure 15:
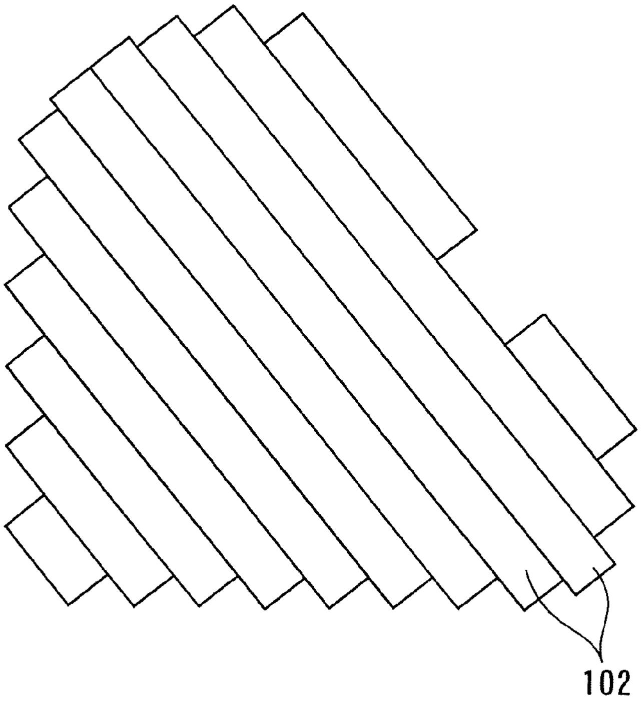
FIG. 15 is a plan view showing a state in which a plurality of soundboard workpieces are joined side by side.
Figure 16:
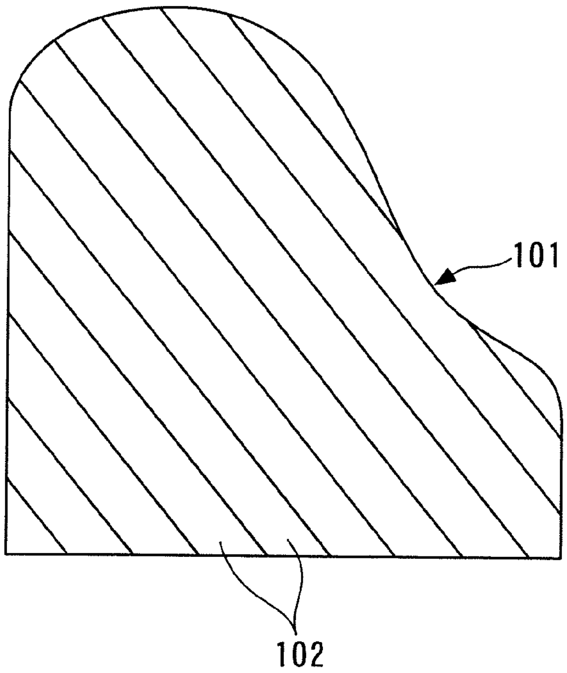
FIG. 16 is a plan view of a soundboard cut out from the soundboard workpieces joined side by side.

Then, in a step 105, the soundboard 101 is assembled by joining the cooled soundboard workpieces 102 side by side (soundboard assembling step). Specifically, after each of the soundboard workpieces 102 is cut into an appropriate length as shown in FIG. 15, the soundboard workpieces 102 are joined side by side, and then the outer periphery of the soundboard workpieces 102 joined side by side are cut, whereby the soundboard 101 having a predetermined shape conforming to the outside shape of a grand piano is cut out, as shown in FIG. 16.

Figure 17:
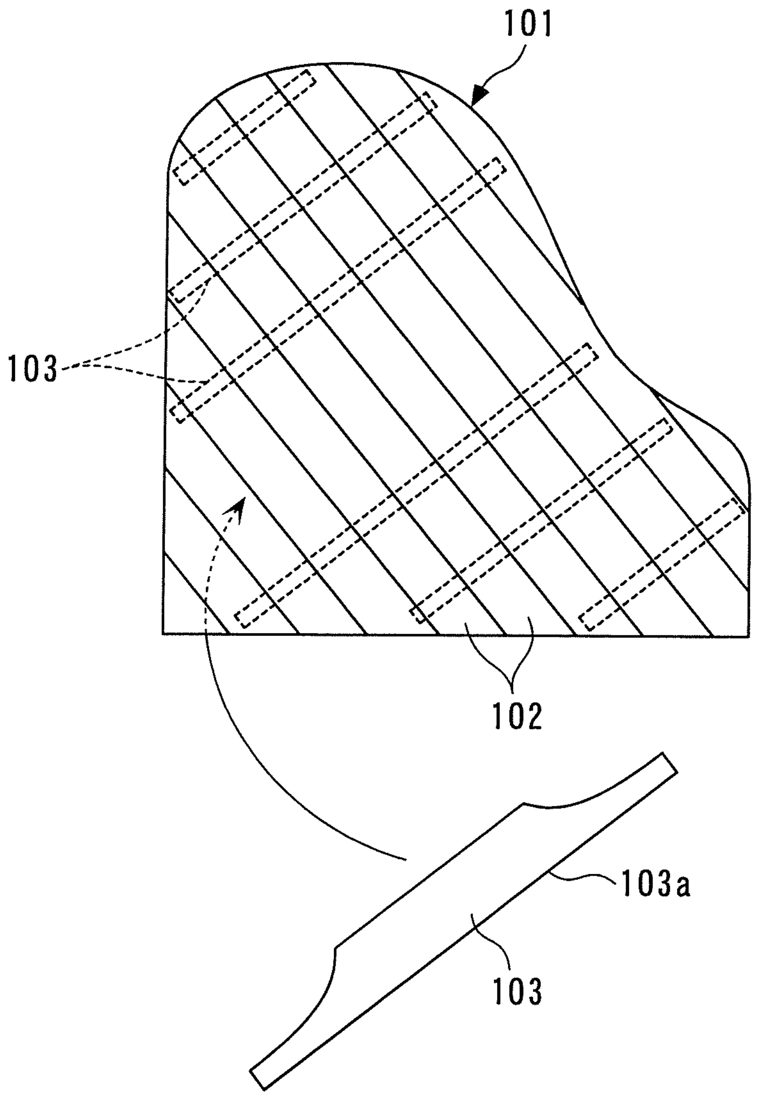
FIG. 17 is a plan view useful in explaining a sound rib-mounting process.

Then, in a step 106, a plurality of sound ribs 103 are joined to the back side of the soundboard 101 (sound rib-mounting step). Each of the sound ribs 103 is formed by working solid wood of spruce or the like, and as shown in FIG. 17, it has a flat mounting surface 103*a* before being mounted to the soundboard 101. The sound ribs 103 are mounted to the soundboard 101 in a manner extending in a direction substantially at right angles to a direction in which the soundboard 101 extends, i.e. in a direction orthogonal to the grain of the soundboard workpiece 102.

Figure 12:
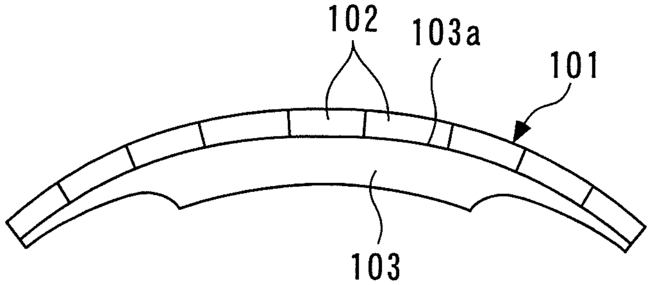
FIG. 12 is a cross-sectional view taken along line A-A of FIG. 11.

Finally, in a step 107, the soundboard 101 having the sound ribs 103 mounted thereon is put into a humidifying chamber (not shown) and is dampened at a predetermined temperature (e.g. 20° C.) and a predetermined humidity (e.g. 60%), whereby the moisture content of the soundboard 101 is increased to a predetermined value (dampening step). As a consequence, the soundboard 101 swells due to moisture absorption, but on the back side of the soundboard 101, the swelling is restrained by the sound ribs 103, so that a crown is formed on the front side of the soundboard 101 due to the difference in the swelling between the front and back sides. This completes the soundboard 101 shown in FIGS. 11 and 12.

As is apparent from the above description, with the soundboard manufacturing system according to the present embodiment, the degree of crystallization of cellulose forming the soundboard workpieces 102 is increased by the heating processing described hereinbefore, so that it is possible to reduce the swelling/shrinkage rate of the soundboard workpieces 102 caused by becoming dry and damp. As a consequence, it is possible to improve the dimensional stability of the soundboard 101.

Further, when heating the soundboard workpieces 102, the first and second heaters 24*a* and 24*b* are controlled independently of each other such that the detected front-side and back-side temperatures T1 and T2 become the first and second predetermined temperatures TREF1 and TREF2, respectively. This makes it possible to control the front-side and back-side temperatures T1 and T2 of each of the soundboard workpieces 102 in a fine-grained manner, so that it is possible to accurately manufacture the soundboard 101 having desired properties modified by the heating processing.

Furthermore, since the heated soundboard workpieces 102 are subjected to cooling and moisture conditioning, compressive internal stress remaining in the outer peripheral portion of the soundboard workpiece 102 prevents a fine flaw in the outer peripheral portion of the soundboard workpiece 102 from growing due to tensile stress, which makes the soundboard 101 difficult to crack. This makes it possible to excellently maintain the acoustic characteristics of the soundboard

101, thereby making it possible to ensure excellent sound quality and sound volume of an associated grand piano, and contribute to reduction of maintenance costs required for replacement or repair of the soundboard 101.

Although in the heating control process in the above-describe second embodiment, the first predetermined temperature TREF1 as a target temperature of the front-side temperature T1 of each soundboard workpiece 102 and the second predetermined temperature TREF2 as a target temperature of the back-side temperature T2 of each soundboard workpiece 102 are set to the same temperature, the second predetermined temperature TREF2 may be set to a temperature approximately 10° C. lower than the first predetermined temperature TREF1 to thereby increase the rate of swelling/shrinkage on the front side of the soundboard workpiece 102 caused by its becoming dry and damp. With this configuration, when the soundboard 101 is dampened to form a crown, the soundboard 101 can be easily made convex, whereby the crown can be efficiently formed in a short time. What is more, the swelling/shrinkage rate is different between the front and back sides of the soundboard 101 and is reduced as a whole in the soundboard 101, so that even with a change in humidity or the like in the outside air, the crown is difficult to be deformed, which makes it possible to obtain a crown excellent in stability.

Next, a description will be given of a soundboard manufacturing system and method according to a third embodiment of the present invention.

The soundboard manufacturing system according to the present embodiment includes a heating device 21 (see FIGS. 5 and 6) for heating soundboard workpieces 102 and a vibrating device 121 (see FIG. 19) for vibrating the soundboard workpieces 102.

The heating device 21 in the present embodiment is identical in arrangement to that in the first embodiment except that soundboard workpieces are processed, and therefore description thereof is omitted, with the same reference numerals denoting the respective component parts.

Figure 19:
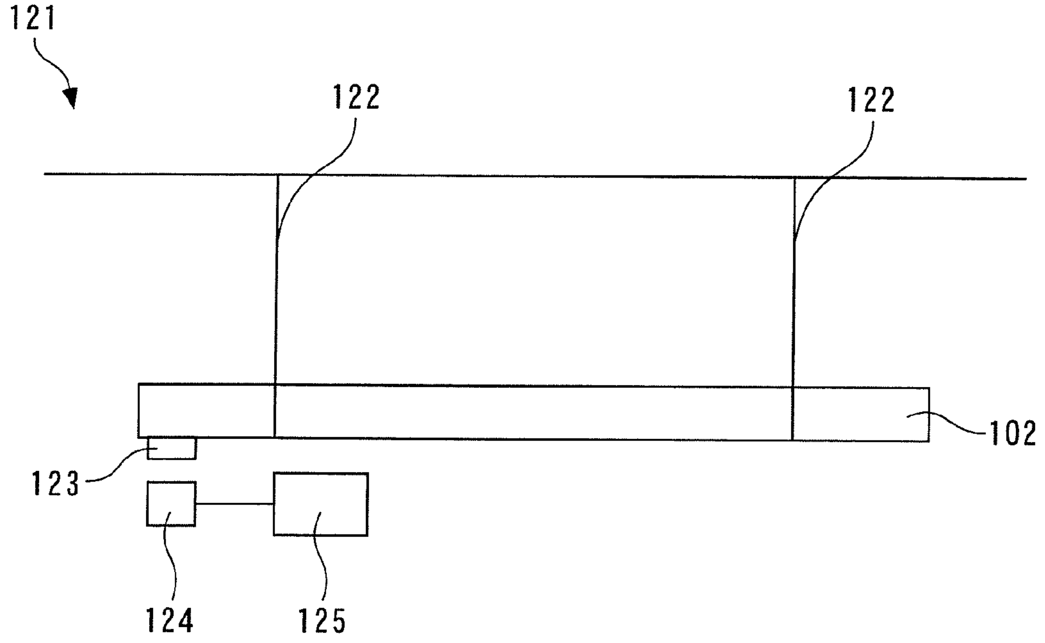
FIG. 19 is a schematic view of a vibrating device.

As shown in FIG. 19, the vibrating device 121 is comprised of two wires 122 and 122 for supporting a soundboard workpiece 102 in a horizontally suspended state, an iron piece 123 attached to the lower surface of one end of the soundboard workpiece 102, an electromagnet 124 disposed below the iron piece 123 for attracting the iron piece 123, and a controller 125 for controlling energization and deenergization of the electromagnet 124.

When electric power is supplied, the electromagnet 124 enters an energized (ON) state. As a consequent, as the iron piece 123 attached to the soundboard workpiece 102 is attracted by the electromagnet 124, the one end of the soundboard workpiece 102 is moved downward.

When the supply of electric power is stopped, the electromagnet 124 enters a deenergized (OFF) state. As a consequence, as the iron piece 123 is released from the state attracted by the electromagnet 124, the one end of the soundboard workpiece 102 is moved upward.

Therefore, as the electromagnet 124 is alternately switched on and off by the controller 125, the one end of the soundboard workpiece 102 is caused to vertically move toward and away from the electromagnet 124. As a consequence, free flexural vibration occurs all over the soundboard workpiece 102 to cause the same to vibrate.

Figure 18:
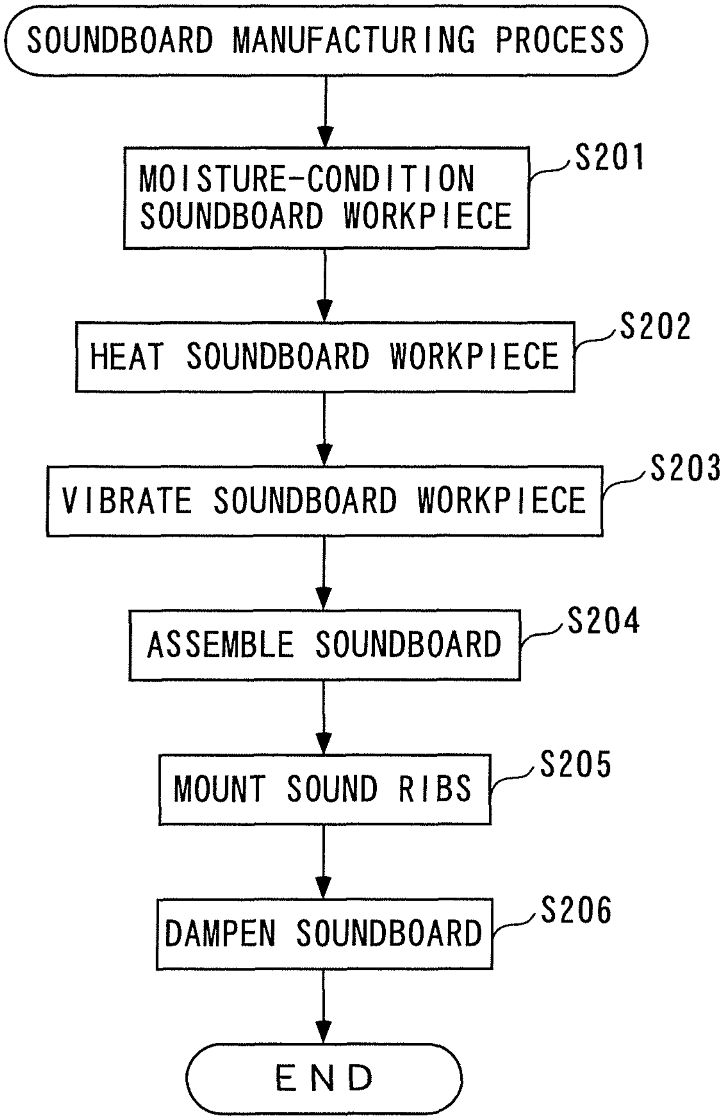
FIG. 18 is a diagram showing a flow of a soundboard manufacturing process to which is applied a third embodiment of the present invention.

In the following, a description will be given of a method of manufacturing a soundboard 101 using the soundboard manufacturing system according to the present embodiment. FIG. 18 shows a flow of an overall soundboard manufacturing process.

First in a step 201, a plurality of soundboard workpieces 102 are subjected to moisture conditioning (moisture conditioning step).

This moisture conditioning for the soundboard workpieces 102 is performed, after cutting raw wood, such as spruce, into boards, by putting the boards into a moisture conditioning chamber (not shown) to forcibly dry them under conditions of a predetermined temperature (e.g. 50 to 100° C.) and a predetermined humidity (e.g. 30 to 90%). As a consequence, the soundboard workpieces 102 are adjusted to have a predetermined moisture content e.g. below 10% (e.g. 8%).

Then, in a step 202, the soundboard workpieces 102 subjected to moisture conditioning in the step 201 are heated (heating step). This heating step is the same as that in the first embodiment, i.e. the heating processing for heating wood workpieces, and therefore description thereof is omitted.

In the following step 203, each of the heated soundboard workpieces 102 is vibrated by the vibrating device 121 (vibrating step). In the vibrating step, the soundboard workpiece 102 heated to become fully dried in the step 202 is suspended by the wires 122 and 122, and then the electromagnet 124 is alternately switched on and off. The frequency of the switching at this time corresponds to basic (primary) vibration of the soundboard workpiece 102.

As a consequence, the one end of the soundboard workpiece 102 is caused to vertically move toward and away from the electromagnet 124, whereby free flexural vibration occurs all over the soundboard workpiece 102 to cause the same to vibrate.

Then, in a step 204, the soundboard 101 is assembled by joining the vibrated soundboard workpieces 102 side by side (soundboard assembling step).

Then, in a step 205, a plurality of sound ribs 103 are joined to the back side of the soundboard 101 (sound rib-mounting step).

Finally, in a step 206, the soundboard 101 having the sound ribs 103 mounted thereon is put into a humidifying chamber (not shown) and is dampened at a predetermined temperature (e.g. 20° C.) and a predetermined humidity (e.g. 60%), whereby the moisture content of the soundboard 101 is increased to a predetermined value (dampening step).

According to the soundboard manufacturing system and method of the present embodiment, it is possible to more efficiently and quickly adjust the soundboard workpieces 102 to have a desired moisture content by the moisture conditioning processing described above than when the soundboard workpieces 102 is subjected to natural seasoning.

Further, the degree of crystallization of cellulose forming each of the soundboard workpieces 102 is increased by the heating processing, whereby it is possible to reduce the rate of swelling/shrinkage of the soundboard workpieces 102 caused by its becoming dry and damp. As a consequence, it is possible to improve the dimensional stability of the soundboard 101.

Furthermore, dimensional change of the respective soundboard workpieces 102 is suppressed, whereby it is possible to improve the manufacturing yield of the soundboard 101 to thereby reduce manufacturing costs.

What is more, when heating the soundboard workpieces 102, the first and second heaters 24*a* and 24*b* are controlled independently of each other such that the detected front-side and back-side temperatures T1 and T2 becomes the first and second predetermined temperatures TREF1 and TREF2, respectively, whereby it is possible to control the front-side and back-side temperatures T1 and T2 of each of the soundboard workpieces 102, in a fine-grained manner, and hence accurately manufacture the soundboard workpiece 102 having desired properties modified by the heating processing.

In addition, flexural vibration occurs in each of the soundboard workpieces 102 by execution of the vibrating processing, whereby the molecular orientation of each soundboard workpiece 102 is stabilized, and internal strain remaining in the soundboard workpiece 102 is eliminated. As a consequence, internal friction in the soundboard workpiece 102 can be reduced, which makes it possible to manufacture the soundboard 101 more excellent in acoustic characteristics than the conventional soundboard.

Although in the present embodiment, the vibrating processing is executed after the heating processing, the sequence may be reversed. In this case as well, the molecular orientation of each soundboard workpiece 102 is stabilized and internal strain remaining in the soundboard workpiece 102 is eliminated by the vibrating processing, whereby it is possible to reduce internal friction in the soundboard workpiece 102, so that it is possible to obtain the same advantageous effects as described above.

Further, a vibrating device different in arrangement from the vibrating device 121 employed in the present embodiment may be used as vibrating means for vibrating the soundboard workpieces 102.

Although in the heating control process in the third embodiment as well, the first predetermined temperature TREF1 as a target temperature of the front-side temperature T1 of each soundboard workpiece 102 and the second predetermined temperature TREF2 as a target temperature of the back-side temperature T2 of each soundboard workpiece 102 are set to the same temperature, the second predetermined temperature TREF2 may be set to a temperature approximately 10° C. lower than the first predetermined temperature TREF1 to thereby increase the swelling/shrinkage rate on the front side of the soundboard workpiece 102. This makes it possible to obtain the same advantageous effects as provided by the second embodiment.

It should be noted that the present invention is not limited to the above-described first to third embodiments, but it can be practiced in various forms. For example, although in the first and second embodiments, compressive internal stress remains in the outer peripheral portion of each wood workpiece 11 and each soundboard workpiece 102 and tensile internal stress remains in the inner portion by execution of the cooling and moisture conditioning after the heating processing, processing may be performed such that the compressive internal stress remains all over within each wood workpiece 11 and each soundboard workpiece 102.

Further, although in the first embodiment, the wood member for a musical instrument is applied to a grand-piano key, by way of example, this is not limitative, but the present invention can be applied to another wood member for a musical instrument, such as a keyframe or a hammer shank for a grand piano or an upright piano.

Furthermore, although in the second and third embodiments, the present invention is applied to manufacturing of a grand-piano soundboard, this is not limitative, but the present invention can be applied to manufacturing of a soundboard for another desired instrument, such as an upright piano, a violin or a guitar.

It is further understood by those skilled in the art that the foregoing are preferred embodiments of the invention, and that various changes and modifications may be made without departing from the spirit and scope thereof.

What is claimed is:

1. A method of manufacturing a wood member for a musical instrument, comprising:

heating a wood workpiece as a workpiece for the wood member at a predetermined temperature until the wood workpiece become fully dried with a moisture content of 0%;

cooling the heated wood workpiece; and performing moisture conditioning of the cooled wood workpiece such that compressive internal stress is generated at least in an outer peripheral portion of the wood workpiece.

2. A soundboard manufacturing system for manufacturing a wooden soundboard that is used in an acoustic musical instrument and is vibrated for generating musical tones, comprising:

preliminary moisture conditioning means for performing preliminary moisture conditioning to adjust humidity of a wooden soundboard workpiece as a workpiece for the soundboard;

a heating chamber for receiving therein the soundboard workpiece subjected to the preliminary moisture conditioning;

first and second heaters disposed in said heating chamber in a manner facing respective front and back sides of the soundboard workpiece received in said heating chamber, for heating the soundboard workpiece;

first and second temperature sensors for detecting respective front-side and back-side temperatures of the soundboard workpiece; and control means for controlling said first and second heaters such that the detected front-side and back-side temperatures of the soundboard workpiece becomes a first predetermined temperature and a second predetermined temperature, respectively.

3. The soundboard manufacturing system according to claim 2, further comprising:

cooling means for cooling the heated soundboard workpiece; and moisture conditioning means for performing moisture conditioning of the soundboard workpiece cooled by said cooling means, such that compressive internal stress remains at least in an outer peripheral portion of the soundboard workpiece.

4. The soundboard manufacturing system according to claim 2, wherein the first predetermined temperature and the second predetermined temperature are different from each other.

5. The soundboard manufacturing system according to claim 3, wherein the first predetermined temperature and the second predetermined temperature are different from each other.

6. A soundboard manufacturing system for manufacturing a wooden soundboard that is used in an acoustic musical instrument and is vibrated for generating musical tones, comprising:

moisture conditioning means for performing moisture conditioning of a wooden soundboard workpiece as a workpiece for the soundboard such that the soundboard workpiece has a predetermined moisture content;

heating means for heating the soundboard workpiece at a predetermined temperature; and vibrating means for vibrating the soundboard workpiece.

* * * * *